April 10, 1934.                  H. LENTZ                    1,954,417
                      VALVE GEAR FOR STEAM ENGINES
                         Filed April 12, 1929          3 Sheets-Sheet 1
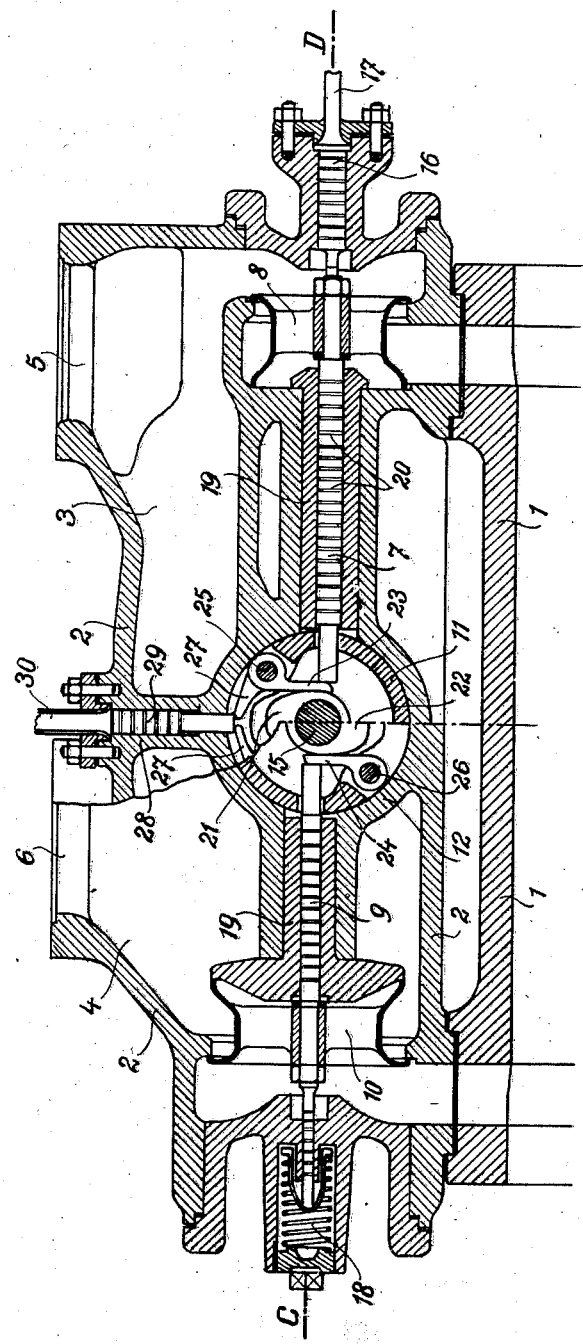

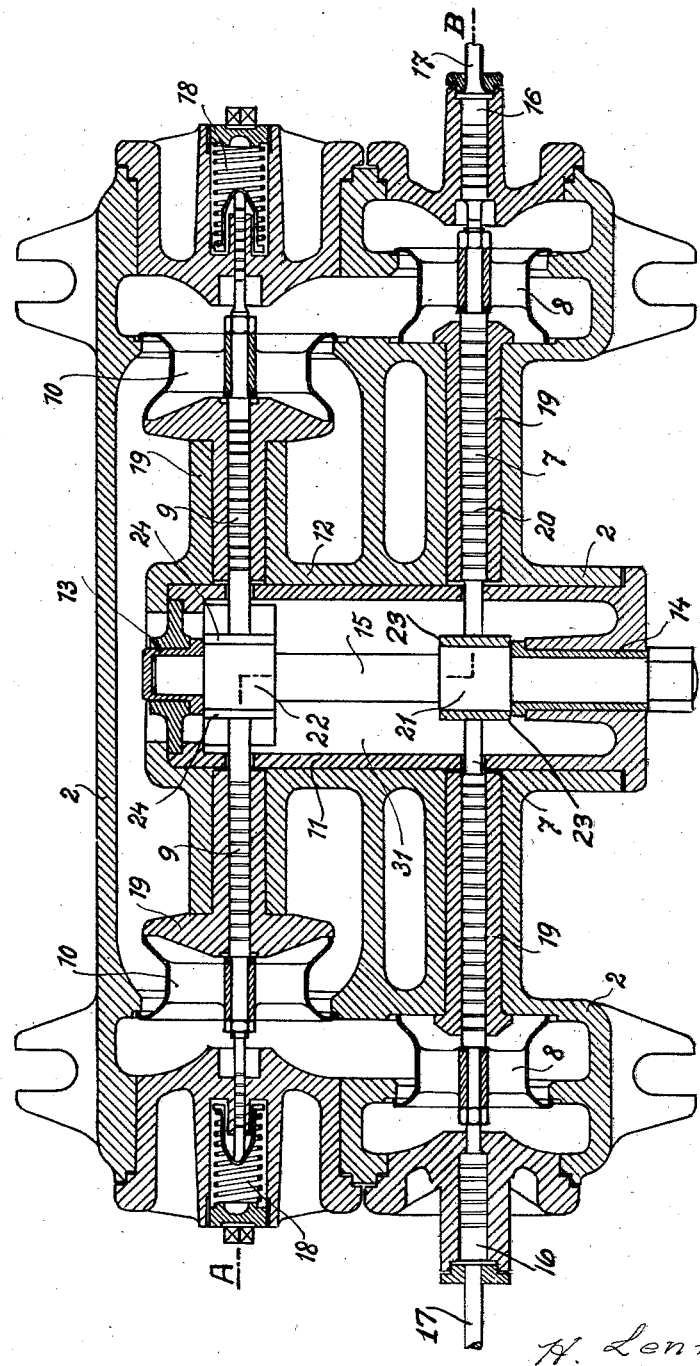

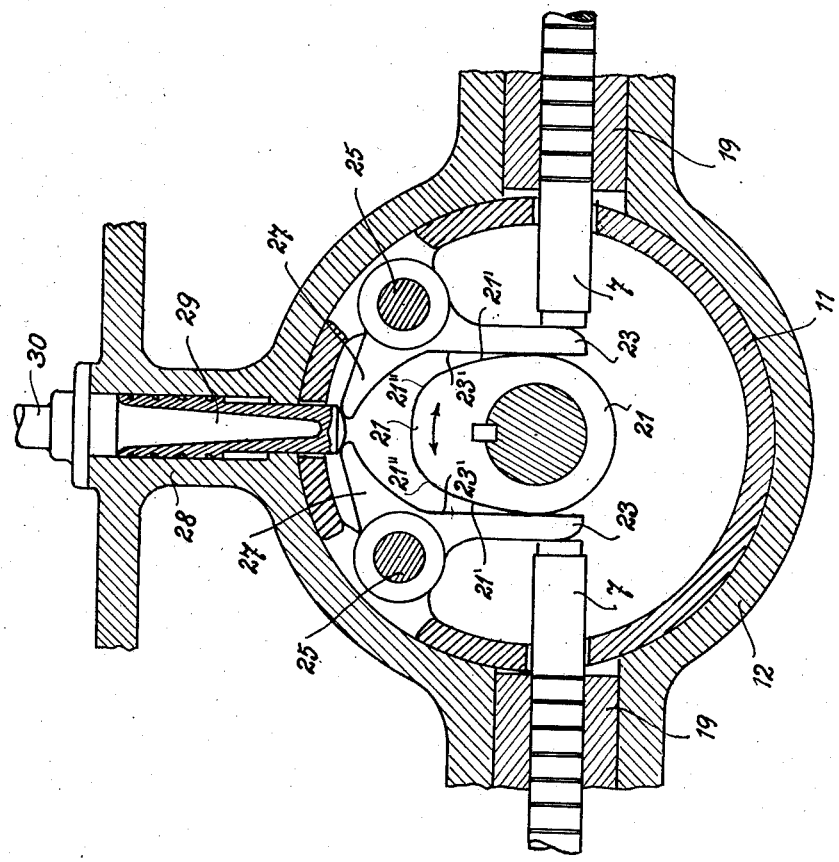

Patented Apr. 10, 1934

1,954,417

UNITED STATES PATENT OFFICE 1,954,417

VALVE GEAR FOR STEAM ENGINES

Hugo Lentz, Vienna, Austria

Application April 12, 1929, Serial No. 354,635
In Austria March 20, 1928

1 Claim. (Cl. 121—127)

The invention relates to valve gearing for locomotive and ships' engines in which the valve spindles are parallel to the axis of the cylinder and project with their ends into a space traversed by the cam shaft. This space is only very small and in consequence the means for operating the valve spindles must form a very compact structure. To actuate the valves of such locomotive or ship engines either rocking or rotating cams or the like have been used which act directly or through the medium of single armed rock levers on the valve spindles. Actuating means consisting of rollers and cam discs have also been used. Both forms of valve gearing afford the advantage that they require little space and therefore afford the necessary compact structure. The cam operating members have however the disadvantage that the plane portions of the cooperating surfaces of the operating members actuated thereby rub on one another producing great friction losses and rapid wear. With roller gearing wear takes place more slowly.

The roller lever gearing employed in stationary engines avoids the above disadvantages. The co-operating surfaces are subjected to substantially no wear and the valves are opened without shock and with very rapidly increasing speed. For locomotive and ship engines however such roller lever gearing has not hitherto been employed because in the known form employed in stationary engines such gearing does not permit of a compact structure such as is essential in locomotive and ship engines.

The present invention has for its object to combine the advantages referred to of oscillating cam gearing with roller lever gearing and thereby to provide a valve gearing which on the one hand affords as compact a construction as oscillating cam gearing and produces as little wear and also gives as rapid an opening of the valves and as free from shock as roller lever gearing. The problem is solved by so forming the oscillating cams mounted in known manner on a cam shaft that they act as roller levers having rolling surface contact with the oscillating levers and imparting to the latter such movements as effect an initial valve opening free from shock and a very rapidly increasing opening. The two actuating roller levers serving to actuate the inlet and exhaust valves are formed as double acting roller levers and together with the adjacent pair of cooperating roller levers are offset in relation to one another by 180°.

The present invention also affords a pressure balancing device adapted to the new roller lever gearing for no load running of a locomotive, which consists essentially in this that the co-operating roller levers actuated by an oscillating roller lever and actuating the inlet valves can be brought by means of a piston under steam pressure into a position corresponding to the open position of the valves.

One embodiment of the invention is illustrated in the accompanying drawings in which Fig. 1 is a longitudinal section through the valve gear casing on the line A—B of Fig. 2, while Fig. 2 is a longitudinal section on the line C—D of Fig. 1. Fig. 3 shows to enlarged scale a cross section through the cam shaft chamber.

On the steam cylinder 1 is mounted a valve box 2 to the admission chamber 3 of which live steam passes by way of the branch 5 while the exhaust steam passes from the exhaust chamber 4 by way of the branch 6. The spindles 7 of the inlet valves 8 and the spindles 9 of the exhaust valves 10 are parallel to the axis of the cylinder and project with their free ends into a cylindrical bush 11 which is fitted in a cylindrical housing 12 in the valve box 2 and in which the rocking cam shaft 15 is mounted in bushes 13, 14. The inlet valves 8 are pressed on their seats by steam pressure; for that purpose the valve spindles 7 may be extended to abut against a small piston 16 to which live steam is supplied by a narrow pipe 17 (see Fig. 2 right hand end). The spring 18 closing the exhaust valves 10 are arranged externally of the valve box 2 away from the effect of the steam and easily accessible. All the valve spindles are mounted in bushes 19 in known manner and rendered tight by means of labyrinth packing 20.

On the cam shaft 15 are mounted two rocking roller levers 21, 22 which are offset in relation to one another by 180° and of which the former 21 is adapted to operate the inlet valves 8 and the latter 22 to operate the exhaust valves 10. The two actuating roller levers 21, 22 are symmetrically shaped and co-operate with rock levers 23, 24 which present co-operating rolling surfaces 23', 24', and act with their free ends on the valve spindles 7 and 9. The active rolling surfaces 21' and 22' of the rock levers 21, 22 afford very flat curves (Fig. 3). The pivots 25 of the rock levers 23 and the pivots 26 of the rock levers 24, are so arranged in relation to the axis of rotation of the roller levers 21, 22 that the latter in their rocking movement act in the direction of the arrow in Fig. 3 to produce a rolling movement on the rock levers 23, 24 presenting the opposed rolling surfaces 23', 24'. This rolling movement, as indicated in Fig. 3, provides first a small but very rapidly and continuously increasing cam arm 21 formed as a roller lever acting on an arm of the cooperating roller lever which is at first large but rapidly becomes smaller. As a result the levers 23, 24 move in the opposite direction to the levers 21, 22 and in consequence an opening of the valves free from shock yet exceedingly rapid is obtained. As the surfaces 21' and 23' have substantially no sliding movement with respect to one another practically no friction is produced and consequently no wear. On the further movement of the levers 21 and 22 the rounded end portions 21" and 22" of the rolling surfaces 21' and 22' act on the ends of the rolling surfaces 23' and 24' of the levers 23 and 24. The rounded surfaces 21" and 22" no longer act as pure rolling surfaces but, as they rub over the cooperating surfaces 23 and 24, act after the manner of cams or rock cams. On the rounded off parts 21" and 22" as also on the ends of the rolling surfaces 23' and 24' friction therefore is produced accompanied by wear but such friction and wear are very small because the levers 21 and 22 and the levers 23 and 24 are very wide (see Fig. 2) and the wear at the parts mentioned has no practical effect on the valve opening. The opening of the valves i. e. the admission, the admission lead and the compression are effected by pure roller lever action and they depend solely on the character of the rolling surfaces 21', 22', 23', and 24' which are practically subjected to no wear.

As the roller lever effect is employed for the lifting of the valves, that is for each phase of the valve operation for which its advantages have full play, while for those phases in which the disadvantages of oscillating cam or cam gearing are of no importance, namely during full opening, the roller lever gearing becomes an oscillating cam or cam gearing, the advantages of both forms are combined as far as possible without any serious disadvantages. The invention also permits of the whole of the gearing being mounted within as small a cam shaft chamber as the ordinary cam gearing.

The transmission ratio between the roller levers 21, 22 and the cooperating levers 23, 24 and consequently the speed of the opening of the valves can be considerably increased by arranging the spindles 7 of the inlet valves 8 a little beneath the axis of the cam shaft 15 and the spindles 9 of the exhaust valves 10 a little above the axis of the cam shaft 15 (see Fig. 1).

The valve gearing in accordance with the invention allows a very simple arrangement for obtaining balance of the pressure on no load running of the locomotive engine as hereinafter described.

The roller levers 23 are formed as bell crank levers the arms 27 of which are directed towards one another so that in the middle position of the roller lever 21 their ends almost touch (Figs. 1 to 3). In an extension 28 of the casing 12 is mounted for movement a small pressure piston 29 rendered tight by means of labyrinth packing. The lower end of this piston rests on the arms of both levers 23 while its upper end is under the pressure of live steam supplied by a pipe 30. If the inlet valves 8 are closed by steam pressure the piston 29 must be so dimensioned that the steam pressure acting on it is smaller than the closing pressure exerted on one of the inlet valves 8 so that in normal operation of the engine opening of the inlet valves is prevented by the piston 29.

On the rocking movement of the lever 21 and of the two cooperating levers 23 the piston 29 remains at rest as on the rocking movement of the one lever it is supported always by the arm 27 of the other cooperating lever. When during no load the valves 8 are no longer closed by the steam pressure the piston 29 under the pressure of the live steam moves into the cam shaft chamber 21 and presses the arms 27 of both levers downwards. As the result the roller levers 23 are raised from the roller levers 21, both inlet valves are opened and the roller lever 21 swings freely between the two levers 23. Both ends of the cylinder are connected with one another by the admission passages and the steam (or air) contained therein can circulate in known manner without pressure.

The arrangement described for obtaining pressure balance on locomotive engine running idle is not only suitable for roller lever gearing in accordance with the present invention but for all valve gearing in which the valves are actuated by means of intermediate levers.

What I claim is:

A valve gearing for locomotive and ship engines, comprising valves having oppositely arranged spindles disposed parallel to the axis of the engine cylinder, an oscillating cam shaft arranged between said spindles, an actuating rocking roller lever on said shaft, two rocking levers actuated directly by said actuating lever, the ends of the second mentioned levers acting directly on the valve spindles and the rocking axes thereof being arranged symmetrically on both sides of the actuating lever with the free end of the actuating lever extending in a direction opposite that of the second mentioned levers whereby the second mentioned levers are alternately swung outwardly in opposite directions by the actuating lever, the cooperating contact surfaces of the first and second mentioned levers being disposed and curved to perform a rolling movement, the contact surface of the actuating lever terminating at its outer end in a cam surface.

HUGO LENTZ.